US007703471B2

(12) United States Patent
Edwards

(10) Patent No.: US 7,703,471 B2
(45) Date of Patent: Apr. 27, 2010

(54) SINGLE-ACTION DISCHARGE VALVE

(75) Inventor: Richard H. Edwards, Germantown, TN (US)

(73) Assignee: TSM Corporation, Bartlett, TN (US)

(*) Notice: Subject to any disclaimer, the term of this patent is extended or adjusted under 35 U.S.C. 154(b) by 0 days.

(21) Appl. No.: 11/807,074

(22) Filed: May 25, 2007

(65) Prior Publication Data
US 2008/0289694 A1  Nov. 27, 2008

(51) Int. Cl.
F16K 17/14 (2006.01)
F16K 17/40 (2006.01)

(52) U.S. Cl. .................................. 137/68.3; 220/89.3
(58) Field of Classification Search ............... 137/68.3; 220/89.3
See application file for complete search history.

(56) References Cited

U.S. PATENT DOCUMENTS

| 3,399,728 | A | * | 9/1968 | Taylor | 137/68.3 |
|---|---|---|---|---|---|
| 3,762,479 | A | | 10/1973 | Fike et al. | |
| 3,853,180 | A | | 12/1974 | Harris et al. | |
| 3,915,235 | A | * | 10/1975 | Hamilton et al. | 137/68.3 |
| 3,915,237 | A | | 10/1975 | Rozniecki et al. | |
| 3,983,892 | A | | 10/1976 | Hardesty | |
| 4,006,780 | A | | 2/1977 | Zehr | |
| 4,423,326 | A | | 12/1983 | Ball | |
| 4,436,159 | A | | 3/1984 | Revay | |
| 4,532,997 | A | | 8/1985 | Atherton et al. | |
| 4,692,752 | A | | 9/1987 | Abel | |
| 4,830,052 | A | * | 5/1989 | Oberlin et al. | 137/68.3 |
| 4,893,680 | A | | 1/1990 | Wittbrodt et al. | |
| 5,010,911 | A | | 4/1991 | Grant et al. | |
| 5,053,752 | A | | 10/1991 | Epstein et al. | |
| 5,059,953 | A | | 10/1991 | Parsons et al. | |
| 5,075,550 | A | | 12/1991 | Miller et al. | |
| 5,188,182 | A | | 2/1993 | Echols et al. | |
| 5,299,592 | A | | 4/1994 | Swanson | |
| 5,458,202 | A | | 10/1995 | Fellows et al. | |
| 5,470,043 | A | | 11/1995 | Marts et al. | |
| 5,691,704 | A | | 11/1997 | Wong | |
| 5,808,541 | A | | 9/1998 | Golden | |
| 5,918,681 | A | | 7/1999 | Thomas | |
| 6,138,768 | A | | 10/2000 | Fujiki | |
| 6,164,383 | A | | 12/2000 | Thomas | |
| 6,189,624 | B1 | | 2/2001 | James | |

(Continued)

FOREIGN PATENT DOCUMENTS

WO    WO 03/072200 A1    9/2003

Primary Examiner—John Rivell
(74) Attorney, Agent, or Firm—Walker, McKenzie & Walker, P.C.

(57) ABSTRACT

A single-action discharge valve for discharging a vessel's contents. The valve has a valve body with a passage therethrough through which the contents are discharged, a frangible seal held within the valve body and sealing the passage while the seal is intact, and a solenoid including an armature moveable from a first to a second position. As the armature moves, pins or teeth impact and break the frangible seal. Magnets hold the armature in the first position until the solenoid is actuated. The armature is substantially exterior of the passage so that discharge is unimpeded. In one embodiment, the pins reciprocate radially when cammed by the armature and impact the sidewall of a frangible dome seal. In other embodiments, teeth on the armature, or pins in the armature's path, reciprocate parallel to the armature's movement and impact a frangible disk.

17 Claims, 6 Drawing Sheets

U.S. PATENT DOCUMENTS

| | | |
|---|---|---|
| 6,619,404 B2 | 9/2003 | Grabow |
| 6,819,237 B2 | 11/2004 | Wilson et al. |
| 6,907,940 B1 | 6/2005 | Ahlers |
| 7,117,950 B2 | 10/2006 | McLane, Jr. |
| 2005/0011552 A1 | 1/2005 | Sundholm |
| 2005/0210894 A1* | 9/2005 | Hirota ...................... 137/68.3 |
| 2007/0044979 A1 | 3/2007 | Popp et al. |

* cited by examiner

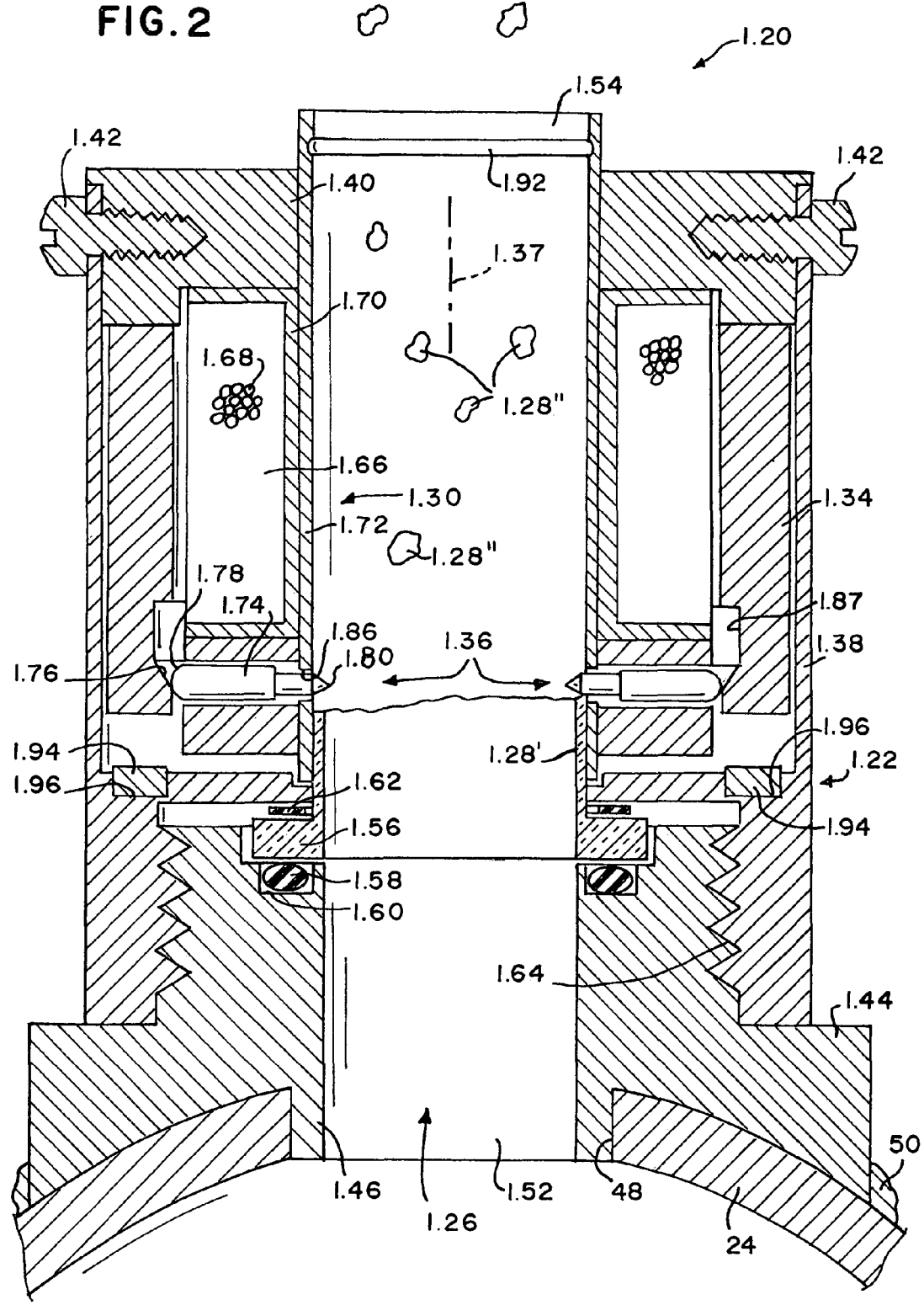

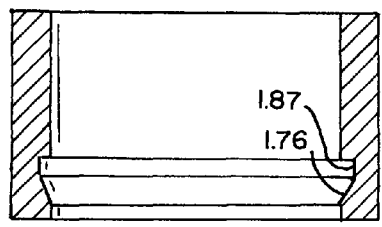
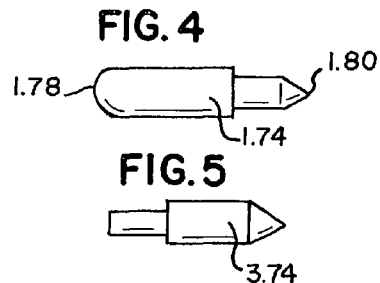
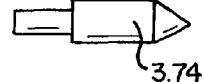
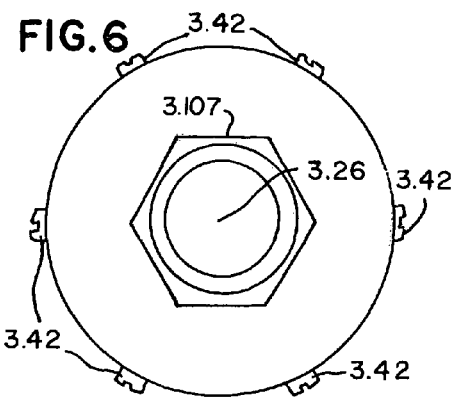
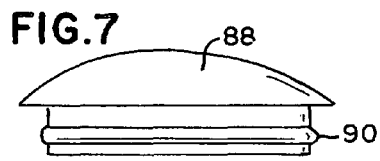
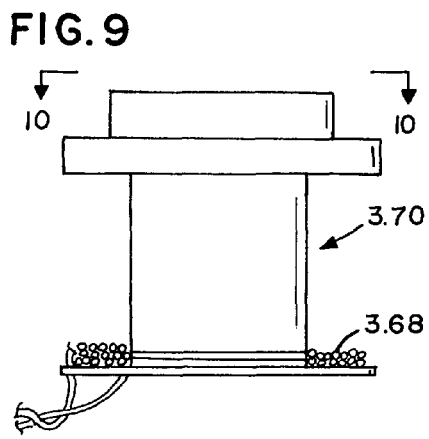
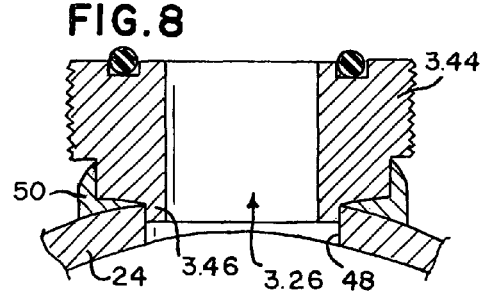
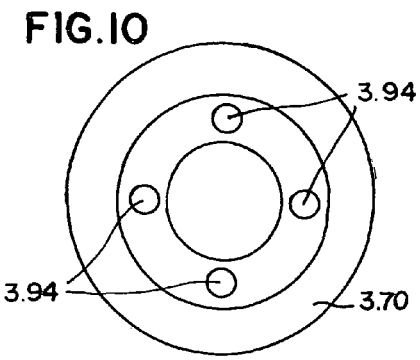
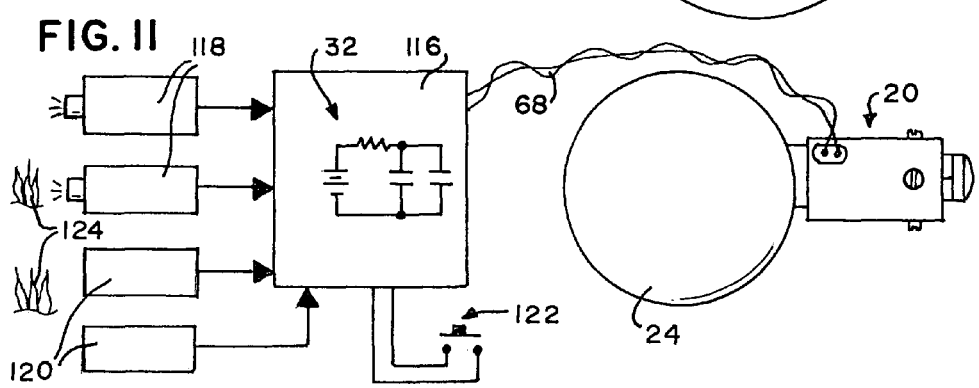

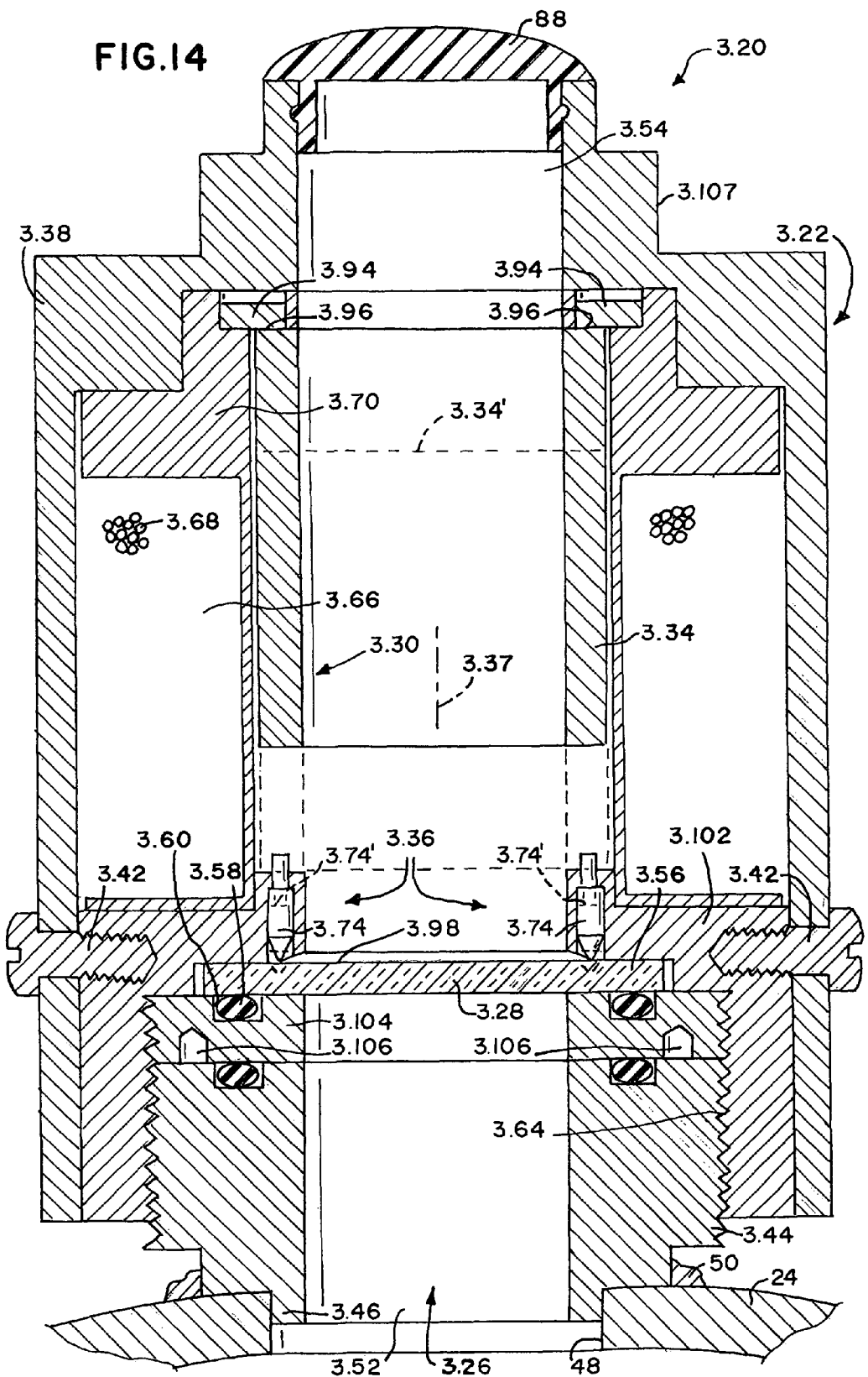

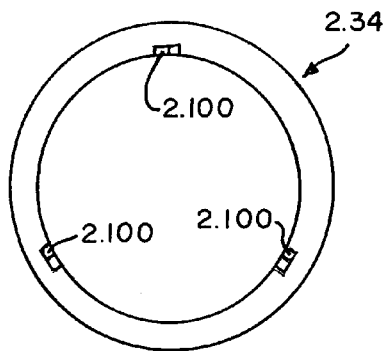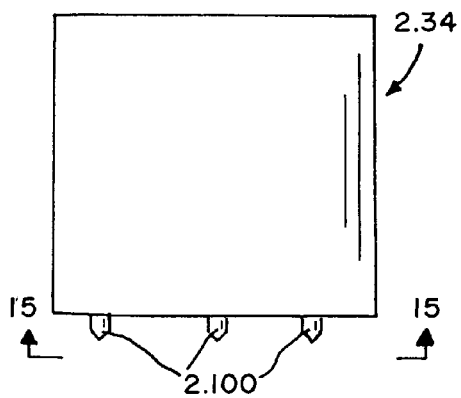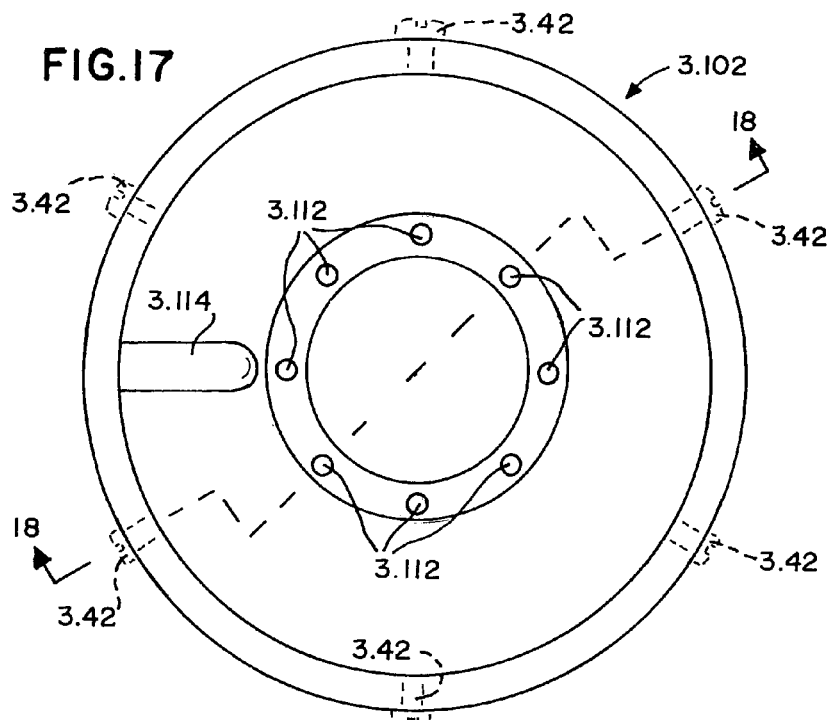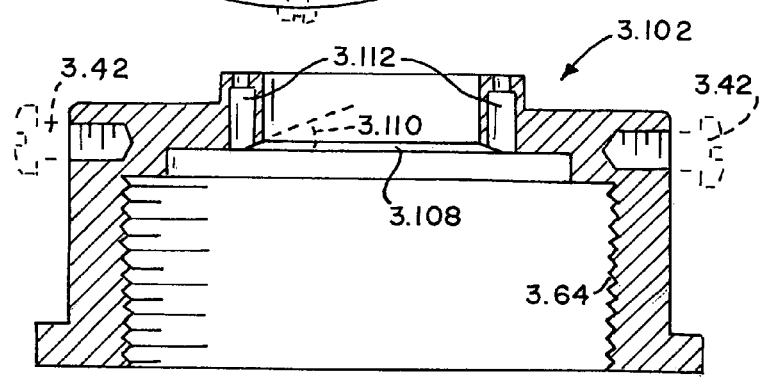

SINGLE-ACTION DISCHARGE VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to discharge valves for releasing gaseous, liquid, or dry material from a pressurized storage vessel, and in particular, to a remotely-operated single-action discharge valve for releasing material from a pressurized storage vessel.

2. Information Disclosure Statement

It is often desired to provide a discharge valve to release a material, such as a gas or liquid or mixture thereof, or a dry material or powder, from a pressurized vessel, and it is further desirable to have such a valve be remotely actuated. Often, the material to be released is corrosive and may corrode the internal components of the valve over time prior to actuation of the valve. Prior art approaches are known that use an explosive charge to cause a piston to drive a piercing element through a valve seal, and such approaches are undesirable if used with a flammable discharge material that might ignite.

It is therefore desirable to have a single-action discharge valve that can be remotely actuated to discharge the contents of a vessel under pressure. It is further desirable that internal components of the valve not be exposed prior to actuation to the pressurized material to be released. Applications for such a valve include release of fire extinguishing material, release of counter-agents in biological and chemical warfare laboratories, and emergency release of fuel in airplanes and boats. When used for emergency release of fuel or other liquids, the valve can be used to discharge from a port on a bottom region of a vessel such as, for example, a fuel tank, and the weight of the liquid in the vessel provides pressure to discharge through the valve, and it is desirable that such a valve have a design that permits scaling from small to large sizes to accommodate a desired discharge rate.

A preliminary patentability search produced the following patents and patent publications, some of which may be relevant to the present invention: Sundholm et al., U.S. Patent Application publication 2005/011552, published Jan. 20, 2005; Harris et al., U.S. Pat. No. 3,853,180, issued Dec. 10, 1974; Rozniecki, U.S. Pat. No. 3,915,237, issued Oct. 28, 1975; Zehr, U.S. Pat. No. 4,006,780, issued Feb. 8, 1977; Thomas, U.S. Pat. No. 5,918,681, issued Jul. 6, 1999; Thomas, U.S. Pat. No. 6,164,383, issued Dec. 26, 2000; Ahlers, U.S. Pat. No. 6,107,940, issued Jun. 21, 2005; and McLane, Jr., U.S. Pat. No. 7,117,950, issued Oct. 10, 2006.

Additionally, the following patent references are also known: Hardesty, U.S. Pat. No. 3,983,892, issued Oct. 5, 1976; Wittbrodt et al., U.S. Pat. No. 4,893,680, issued Jan. 16, 1990; Swanson, U.S. Pat. No. 5,299,592, issued Apr. 5, 1994; James, U.S. Pat. No. 6,189,624, issued Feb. 20, 2001; and Grabow, U.S. Pat. No. 6,619,404, issued Sep. 16, 2003.

Sundholm et al., U.S. Patent Application publication 2005/011552, at FIG. 2, discloses an explosive charge that propels a piercing element to pierce a disk, and FIG. 3 discloses a pressure-driven piston that causes a piercing element to pierce a disk. Harris et al., U.S. Pat. No. 3,853,180, discloses an explosive detonator that causes a pin to pierce a valve seal and release a fire-extinguishing medium under pressure. Rozniecki, U.S. Pat. No. 3,915,237, discloses a ruptureable disc that is pierced by a cutting annulus that is moved by an explosive charge. At column 1, lines 45 to 50, Rozniecki discloses use of infrared and ultraviolet sensors to sense fire. Hardesty, U.S. Pat. No. 3,983,892, discloses an explosive valve having an electrical detonator that shears a diaphragm seal. Zehr, U.S. Pat. No. 4,006,780, discloses a rupturing head for fire extinguishers wherein a fusible link melts and causes a spring-loaded punch to rupture a sealing disk. Wittbrodt et al., U.S. Pat. No. 4,893,680, discloses sensors for a fire suppressant system and, at column 3, lines 27-30, discloses the use of solenoid and explosive-activated squib valves. Swanson, U.S. Pat. No. 5,299,592, discloses an electrically-operated valve having a spring-biased check valve with a solenoid-actuated pilot valve. Thomas, U.S. Pat. No. 5,918,681, discloses a fire extinguishing system for automotive vehicles in which an explosive squib propels a pin extending axially from a piston to puncture a sealed outlet of a cylinder, thereby releasing extinguishing material, and an alternate embodiment discloses using a solenoid to propel the piston and pin. Thomas, U.S. Pat. No. 6,164,383, has a similar disclosure to Thomas, U.S. Pat. No. 5,918,681, and additionally discloses control circuitry with sensors. Ahlers, U.S. Pat. No. 6,107,940, discloses a valve in which a pressure cartridge actuator is used to cause a pressure wave that ruptures a frangible disc to release fire suppressant material. James, U.S. Pat. No. 6,189,624, discloses a fire extinguisher in which a matchhead detonator, of the type used in pyrotechnic devices, is used to move a piston with a sharp spike so that the spike ruptures a diaphragm and causes release of fire suppressant material. Grabow, U.S. Pat. No. 6,619,404, discloses a fire extinguisher piping system below deck in an aircraft, with discharge nozzles in the passenger and crew compartments. McLane, Jr., U.S. Pat. No. 7,117,950, discloses a manual discharge fire suppression system in combination with either an electrically-operated explosive squib or an electrically-driven solenoid that moves a piston from a retracted position to a extended position, thereby causing a ram with a piercing member to pierce a seal and cause a fire suppressant to be released.

None of these references, either singly or in combination, disclose or suggest the present invention.

BRIEF SUMMARY OF THE INVENTION

The present invention is a single-action discharge valve that can be remotely actuated. A solenoid reciprocates an armature, causing a frangible seal to become broken and to release the contents of a pressurized vessel through the valve. One or more pins or teeth are moved by the armature to break the frangible seal. An open, unblocked passage through the valve and its armature discharges the contents of the vessel when the seal becomes broken. Until actuation of the solenoid, the armature is preferably held in a first position by one or more magnets.

It is an object of the present invention to provide a single-action discharge valve that can be remotely actuated to discharge the contents of a vessel under pressure. It is a further object of the present invention that internal contents of the valve not be exposed prior to actuation to the pressurized material to be released. It is a further object of the invention that the valve, after discharge, be easily reconditionable for subsequent reuse.

BRIEF DESCRIPTION OF THE SEVERAL VIEWS OF THE DRAWING

FIG. 2 is also a sectional view of the first embodiment of the present invention taken along the same diameter as in FIG. 1, but showing the armature in a second position in which the reciprocated pins have broken the frangible seal.

FIG. 3 is sectional view of the armature of the first embodiment of the present invention, taken along a diameter of the armature.

FIG. 4 is a side view of a pin of the first embodiment of the present invention.

FIG. 5 is a side view of a pin of the third embodiment of the present invention.

FIG. 6 is a top view of the third embodiment of the present invention.

FIG. 7 is a side elevation view of the outlet cap of all embodiments of the present invention.

FIG. 8 is a sectional view of the base mounting of the third embodiment of the present invention.

FIG. 9 is a side elevation view of the bobbin of the third embodiment of the present invention.

FIG. 10 is a top view of the bobbin of the third embodiment of the present invention, taken substantially along the line 10-10 shown in FIG. 9.

FIG. 11 is a schematic block diagram symbolically showing sensors and actuating circuitry used with the valve of the present invention.

FIG. 14 is a sectional view of a third embodiment of the present invention taken along a diameter thereof, showing the armature in a first position and, in dotted outline, showing the armature as it moves into a second position in which the reciprocating pins impact the frangible seal.

FIG. 15 is a bottom view of the armature of the second embodiment of the present invention, taken substantially along the line 15-15 shown in FIG. 16.

FIG. 16 side elevation view of the armature of the second embodiment of the present invention.

FIG. 17 is a top view of the base plate of the third embodiment of the present invention, with the position of the casing screws shown in dotted outline for purposes of illustration.

FIG. 18 is a sectional view of the base plate of the third embodiment of the present invention, taken substantially along the line 18-18 shown in FIG. 17, with the position of the casing screws shown in dotted outline for purposes of illustration.

DETAILED DESCRIPTION OF THE INVENTION

Figure 1:
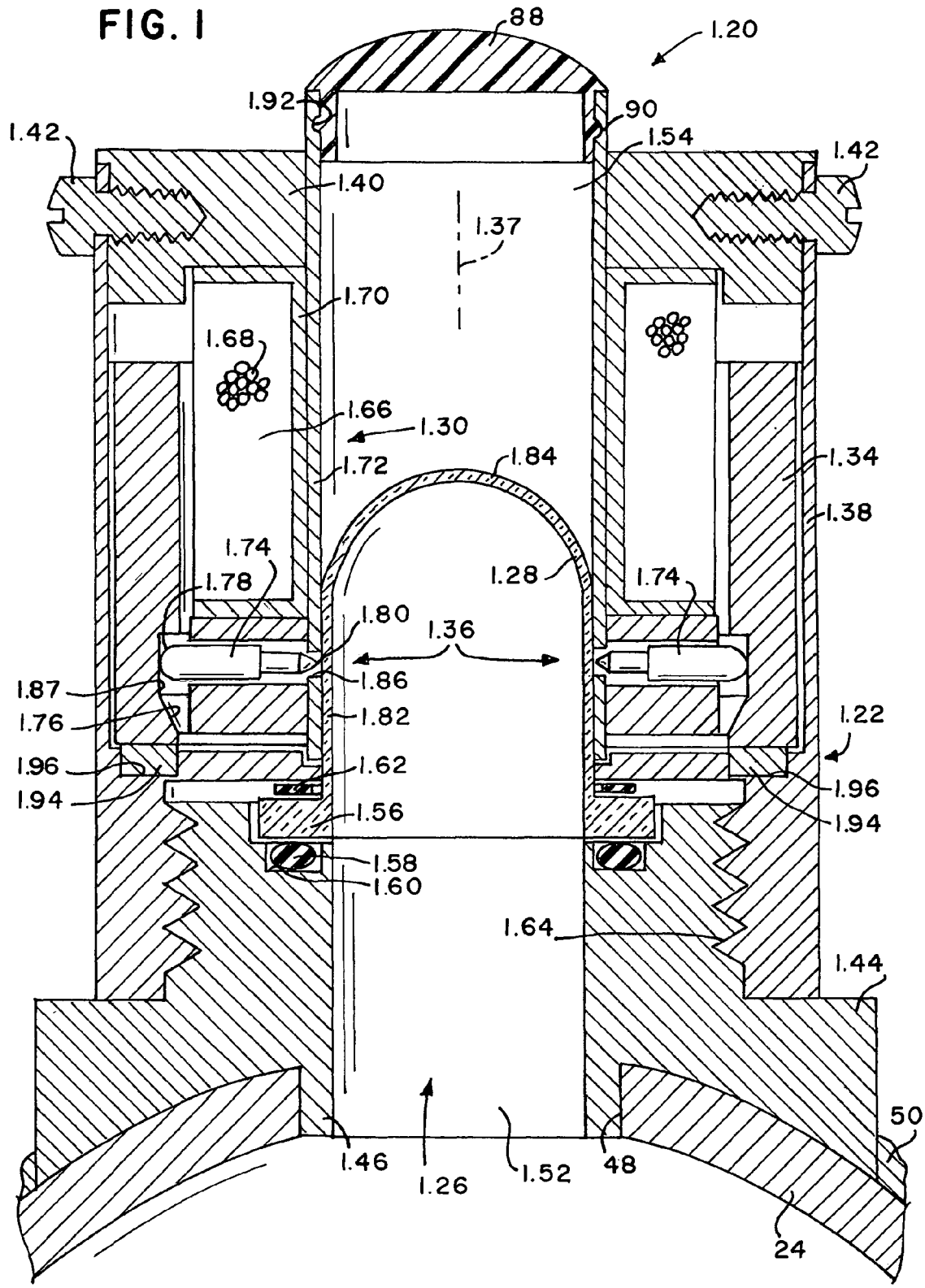
FIG. 1 is a sectional view of a first embodiment of the present invention taken along a diameter thereof, showing the armature in a first position.

Referring to FIGS. 1-18, three preferred embodiments, 1.20, 2.20, and 3.20, of the single-action discharge valve of the present invention are shown. Identifying reference designators for all embodiments of the valve are marked similarly, with the reference designators for the three embodiments respectively having prefixes of "1.", "2.", and "3." and with similar structural features of the various embodiments having the same suffix (e.g., "1.20", "2.20", and "3.20"). It shall be understood that many aspects of the various preferred embodiments are substantially the same, and only the differences will be treated in detail, it being understood that similar structural features of the various embodiments perform similar functions.

All embodiments of the valve 1.20, 2.20, and 3.20 include a valve body, respectively 1.22, 2.22, and 3.22, for attaching to a pressurized vessel 24, and the valve body of all embodiments has a passage, respectively 1.26, 2.26, and 3.26, therethrough through which contents of the vessel are discharged when the valve is opened as hereinafter described. The contents of pressurized vessel 24 may be any pressurized material, such as a gas or liquid or mixture thereof, or a dry material or powder. When used for emergency release of fuel or other liquids, the valve, inverted from the views shown in the drawings, can be used to discharge from a port on a bottom region of a vessel such as, for example, a fuel tank, and the weight of the liquid in the vessel provides pressure to discharge through the valve. All embodiments of the invention are preferably substantially cylindrically symmetric for ease of manufacture and for improved performance, so that sectional views along a diameter of the valve will suffice to show the structure of the valve. However, there is no requirement that the valve be cylindrically symmetric, and other structures can be used without departing from the scope of the present invention. Furthermore, one of the advantages of all embodiments of the valve of the present invention is that it can be readily scaled to smaller or larger sizes in order to provide a larger discharge passage to accommodate any desired discharge flow rate.

All embodiments of the valve also include a frangible seal, respectively 1.28, 2.28, and 3.28 and hereinafter described in greater detail, held within the valve body and sealing the passage while the seal is intact. The frangible seal may be made from glass, polycarbonate or metal, but, in the preferred embodiments shown in the drawings, the frangible seal is made of glass, preferably well-known and inexpensive soda-lime glass. Construction of a frangible seal from metal is well-known, and is done by forming one or more grooves in the seal as by machining or, more often, by chemical etching. An undesirable characteristic of constructing the frangible seal of metal is that certain metals may react with contents of the vessel as by corrosion or contamination while the seal blocks those contents from release prior to actuation of the valve. For this reason, a frangible seal of glass or polycarbonate material is preferred. It shall be noted that, in all embodiments of the invention, all parts of the valve are blocked from the material held in the pressurized vessel by the frangible seal, and thus the valve's components are not exposed to possible corrosion or contamination by, or reaction with, the contents of the vessel prior to discharge.

All embodiments of the valve further include a solenoid, respectively 1.30, 2.30, and 3.30 and hereinafter described in greater detail, for selective connection to an electrical power source 32, such as a battery or other source of electrical power, for selective actuation of an armature, respectively 1.34, 2.34, and 3.34 and hereinafter described in greater detail, of the solenoid. The armature, as hereinafter described for the various preferred embodiments, moves from a first position to a second position and moves impacting means of each embodiment, respectively impacting means 1.36, 2.36, and 3.36, for breaking the frangible seal into at least two pieces, so as to cause the impacting means to break the seal as the armature moves into the second position. The fracturing or breaking of the frangible seal provides an improvement over prior art valves that simply pierce a seal without having the seal fracture or break into pieces and thus do not open up an enlarged passageway for rapid discharge of the contents of a pressurized vessel. In all embodiments, as hereinafter explained in greater detail, the passage, respectively 1.26, 2.26, and 3.26, preferably passes through the armature, with the armature being substantially exterior of the passage and preferably surrounding the passage. Additionally, in all embodiments, the passage preferably has a central axis of symmetry, respectively 1.37, 2.37, and 3.37, along which the armature reciprocates from the first position to the second position.

Referring specifically to FIGS. 1-4 and 7, the structure of the first preferred embodiment 1.20 of the valve of the present invention can now be explained in detail.

Valve body 1.22 of valve 1.20 includes a housing 1.38, a top cap plate 1.40 held within housing 1.38 as by a plurality of screws 1.42, and a base mounting 1.44. Base mounting 1.44 is made of aluminum and has a flange 1.46 that is inserted into a port 48 of vessel 24, and then base mounting 1.44 is welded about its perimeter to vessel 24 as by weld 50 to seal base mounting 1.44 to vessel 24. It shall be understood that valve 1.20 is preferably assembled and tested after welding base mounting 1.44 to vessel 24. It should be understood that all embodiments of the present invention may equivalently, without departing from the spirit and scope of the present invention, have a well-known threaded pipe (not shown) extending from the valve's inlet, respectively 1.52, 2.52, and 3.52, for screwing insertion into a mating threaded port of vessel 24 rather than by welding a base mounting to the vessel.

Valve body 1.22 has an inlet 1.52 and an outlet 1.54 and passage 1.26 through valve body 1.22 connects inlet 1.52 to outlet 1.54, allowing the contents of vessel 24 to discharge through the valve 1.20 when frangible seal 1.28 becomes broken.

Frangible seal 1.28 of valve 1.20 is generally dome-shaped or thimble-shaped, having a seal periphery portion or flange 1.56 at its base that is grippingly and sealingly entrapped within valve body 1.22 between housing 1.38 and base mounting 1.44. A well-known Nitrile O-ring 1.58 on the lower surface of flange 1.56 within circular groove 1.60 in base mounting 1.44 provides a tight seal that prevents leakage of the pressurized contents of vessel 24 while seal 1.28 is intact, and the gripping entrapment of seal 1.28 between housing 1.38 and base mounting 1.44 around flange 1.56 provides, by the high shear strength of seal 1.28 at flange 1.56, great strength for withstanding the pressure in vessel 24 without premature breakage of seal 1.28. Valve 1.20 has a well-known Nitrile washer 1.62 between the upper surface of flange 1.56 and valve housing 1.38 to cushion flange 1.56 of frangible seal 2.28 from breaking during assembly of valve housing 1.38 to base mounting 1.44 as those two parts are screwingly fitted together at threads 1.64.

Valve 1.20 includes a solenoid 1.30 comprising a coil 1.66 constructed of a length of wire 1.68 wound upon a hard-anodized aluminum bobbin 1.70 that encircles a cylindrical core 1.72. It shall be understood that bobbin 1.70 is fully wound with wire 1.68, and that only a portion of wire 1.68 is shown for illustrative purposes. It shall be further understood that bobbin 1.70 may be eliminated if coil 1.66 is wound on an external fixture and then potted with potting compound to maintain its shape, thereby permitting additional coil windings in the space that otherwise would be occupied by the bobbin and, if required by extreme environmental conditions, coil 1.66 may also be potted into place inside valve 1.20.

Solenoid 1.30 further comprises an armature 1.34 that, when coil 1.66 is energized to create a magnetic field therewithin, reciprocates upwardly from a first position shown in FIG. 1 to a second position shown in FIG. 2. The armature of all embodiments as well as the core and the valve body and its housing of all embodiments are preferably constructed of so-called "electrical steel" or "transformer steel" such as SAE C1017 alloy material or equivalent, having low carbon content so as to provide satisfactory magnetic properties. If the armature and the parts of the valve body will be subjected to a corrosive environment, then those parts preferably will be provided with a corrosive-preventative coating so as to prevent corrosion. Alternatively, stainless steel with magnetic properties could be used, or the surface of these parts could be plated with a material such as nickel to prevent corrosion.

Conventional prior art solenoid construction is designed for rapid operation of the solenoid, which calls for an armature of very low mass. In contrast with these teachings, the armatures of the present invention must have significant mass so as to develop sufficient kinetic energy to break the frangible seal. As a rule of thumb, the mass of the armature respectively 1.34, 2.34, and 3.34, should preferably be at least one-half of the mass of the valve body, respectively 1.22, 2.22, and 3.22, so that most of the magnetic energy goes into movement of the armature, thereby developing sufficient force to break the frangible seal. Because the armature, when the solenoid is engaged, reciprocates toward the center of the solenoid, the valve is constructed so that the armature begins its reciprocation from the first position well off-center of the solenoid, and so that the second position, when the impacting means strikes and breaks the frangible seal, occurs before the armature's reciprocation reaches the center of the solenoid. It has been found that the force required to fracture a frangible seal disk is related to the material and the thickness of the frangible seal disk. An armature is chosen to provide a magnetic density and physical size that allows a pre-travel sufficient to reach maximum speed prior to impacting the frangible seal. The electrical power input to the coil is tailored to force the coil to reach maximum magnetic force 2.5 to 3.0 milliseconds after application of a suitable electrical signal to the coil. The electrical voltage and current supplied to the coil, the physical size and mass of the armature, the number of pins or teeth of the impacting means (hereinafter described), and disc size and material are adjusted as required for a given valve size to yield repeatable fracture of the frangible seal of the valve. An advantage of the first embodiment 1.20 over the second and third embodiments 2.20 and 3.20 is that, in the first embodiment 1.20, the armature 1.34, being exterior to the coil 1.66 and thus larger than the armatures of the other embodiments, may have greater mass than armatures 2.34, 3.34.

It shall be understood that frangible seals 1.28, 2.28, and 3.28 must be designed to have a strength sufficient to contain the pressure in vessel 24 and still be able to be broken by the impacting means of each embodiment, as hereinafter described. For a given seal, its strength is determined by the material used, the thickness of the material, the manner in which the seal is gripped, and the presence or absence of surface imperfections on the seal. If a stronger seal is desired, surface imperfections can be removed as by polishing or heat treating. If a weaker seal is desired, surface imperfections may be added as by, for example, etching. In the preferred embodiments of the present invention, it has not been found necessary to add or remove surface imperfections.

Valve 1.20 further includes impacting means 1.36 for breaking frangible seal 1.28 into at least two pieces, with impacting means 1.36 being moved by armature 1.34 to break frangible seal 1.28 as armature 1.34 moves into the second position. In the first embodiment 1.20 of the present invention, impacting means 1.36 includes at least one pin 1.74 mounted for reciprocation within valve body 1.22 in a plane radial with respect to armature 1.34, with the reciprocation plane also including the axis of symmetry of armature 1.34 therewithin and with pin 1.74 preferably being mounted for reciprocation perpendicular to sidewall 1.82 of domed portion 1.84 of frangible seal 1.28. Armature 1.34 has a cam portion 1.76 that engages the rear end 1.78 of pin 1.74 as armature 1.34 moves from the first position shown in FIG. 1 to the second position shown in FIG. 2, thereby causing the pointed tip 1.80 of pin 1.74 to forcibly impact the sidewall 1.82 of domed portion 1.84 of frangible seal 1.28 and thus break the seal 1.28 into at least two pieces, namely, the remainder 1.28' of the seal shown in FIG. 2 with flange 1.56 being held between base mounting 1.44 and housing 1.38, and at least one other seal fragment 1.28" that is discharged through passage 1.26 by the pressure in vessel 24. Preferably valve 1.20 includes a plurality of pins 1.74 angularly spaced about the axis of armature 1.34 so as to jointly impact seal 1.28 at multiple impact points about sidewall 1.82, thereby providing symmetric forces upon armature 1.34 so as not to cause armature 1.34 to bind as it reciprocates and cams pins 1.74. Each pin 1.74 is preferably constructed of case-hardened steel of hardness Rockwell C30 so as to prevent blunting of the tip 1.80 during impact with seal 1.28, and extends through a respective hole 1.86. It should be noted that armature 1.34 has a pre-camming portion 1.87 so that armature 1.34 has a pre-travel portion of reciprocation during which it can build up sufficient kinetic energy prior to engagement of rear portion 1.78 of pins 1.74 by cam portion 1.76 of armature 1.34.

As with all embodiments, valve 1.20 may optionally have a discharge cap 88, preferably made of a durable material such as nylon, inserted into its outlet 1.54, and an encircling flange 90 of cap 88 engages with a mating groove 1.92 within outlet 1.54, so as to retain cap 88 within outlet 1.54 until valve 1.20 is actuated. The purpose of cap 88 is to prevent debris such as mud, etc., from clogging the valve prior to actuation of the valve. When the valve discharges the contents of vessel 24, the pressure of the escaping material easily blows cap 88 off of outlet 1.54.

In order to hold the armature in the first position prior to actuation of the solenoid, one or more magnets 1.94 are mounted in the valve body as in holes 1.96 for magnetically latching armature 1.34 in the first position, and the magnets must be selected to be of sufficient strength so that armature 1.34 does not become released from the first position prior to actuation of the solenoid due to mechanical shocks that the valve might receive, because premature release of the armature prior to actuation of the solenoid could cause unwanted breakage of the frangible seal. This latching also causes the armature to be held in its first position while the coil is developing its full magnetic energy after actuation of the solenoid so that a maximum kinetic energy can be imparted to the armature by the coil, thereby creating a greater impact force to break the frangible seal. If a spring were to be used to keep the armature in the first position, it would oppose the armature during its travel toward the second position and thereby reduce the kinetic energy of the armature for breaking the frangible seal. If a glue were to be used to hold the armature in the first position, such that the solenoid would have to overcome the binding power of the glue in order to release the armature from the first position, such a glue could deteriorate due to temperature and moisture and thus weaken over time, causing premature release of the armature from the first position. The magnets 1.94, which are preferably used in all embodiments of the present invention, are preferably cylindrical and are, for example, 0.125 inches (0.318 cm.) in diameter and 0.625 inches (0.159 cm.) thick, and are glued into holes 1.96. It shall be understood that larger or smaller magnets, and a greater or lesser number of magnets, can be used as the valve is scaled to larger or smaller sizes, without departing from the spirit and scope of the present invention.

Turning now to FIGS. 12, 13, 15, and 16, the second preferred embodiment 2.20 of the valve of the present invention can now be described.

Valve body 2.22 of valve 2.20 includes a housing 2.38, a top cap plate 2.40 held within housing 2.38 as by a plurality of screws 2.42, and a base mounting 2.44. Base mounting 2.44 is made of aluminum and is welded about its perimeter to vessel 24 as by weld 50 to seal base mounting 2.44 to vessel 24, and it shall be understood that, as with the first embodiment 1.20 of the valve shown in FIGS. 1 and 2, base mounting 2.44 may also have a flange for inserting into port 48 of vessel 24. It shall be further understood that valve 2.20 is preferably assembled and tested after welding base mounting 2.44 to vessel 24.

Valve body 2.22 has an inlet 2.52 and an outlet 2.54 and passage 2.26 through valve body 2.22 connects inlet 2.52 to outlet 2.54, allowing the contents of vessel 24 to discharge through the valve 2.20 when frangible seal 2.28 becomes broken.

The frangible seals 2.28 and 3.28 of the second and third embodiments are substantially similar, and a description of seal 2.28 and its mounting will suffice for both.

Seal 2.28 is preferably a disk of soda-lime glass gripped around its perimeter at a seal periphery portion 2.56 by entrapment within valve body 2.22 between housing 2.38 and base mounting 2.44, and a well-known Nitrile O-ring 2.58 within circular groove 2.60 in base mounting 2.44, forms a seal between base mounting 2.44 and frangible seal 2.28. Valve 2.20 has a well-known Nitrile washer 2.62 between the upper surface of seal 2.28 and valve housing 2.38 to cushion frangible seal 2.28 from breaking during assembly of valve housing 2.38 to base mounting 2.44 as those two parts are screwingly fitted together at threads 2.64. It has been found that this washer 2.62 on the upper surface of the frangible seal may be eliminated, as shown for valve 3.20, by a more precise flatness specification/tolerance on the underside surface of the valve body (underside surface of valve housing 2.38 of valve 2.20, or underside surface of base plate 3.102 of valve 3.20) that contacts the frangible seal. Seal 2.28 also provides a fail-safe mechanism whereby seal 2.28 will fracture and break if the pressure within vessel 24 becomes excessive, thereby preventing explosion of vessel 24.

Valve 2.20 includes a solenoid 2.30 comprising a coil 2.66 constructed of a length of wire 2.68 wound upon a hard-anodized aluminum bobbin 2.70 that encircles a cylindrical core 2.72. It shall be understood that bobbin 2.70 is fully wound with wire 2.68, and that only a portion of wire 2.68 is shown for illustrative purposes. It shall be further understood that bobbin 2.70 may be eliminated if coil 2.66 is wound on an external fixture and then potted with potting compound to maintain its shape, thereby permitting additional coil windings in the space that otherwise would be occupied by the bobbin and, if required by extreme environmental conditions, coil 2.66 may also be potted into place inside valve 2.20.

Figure 12:
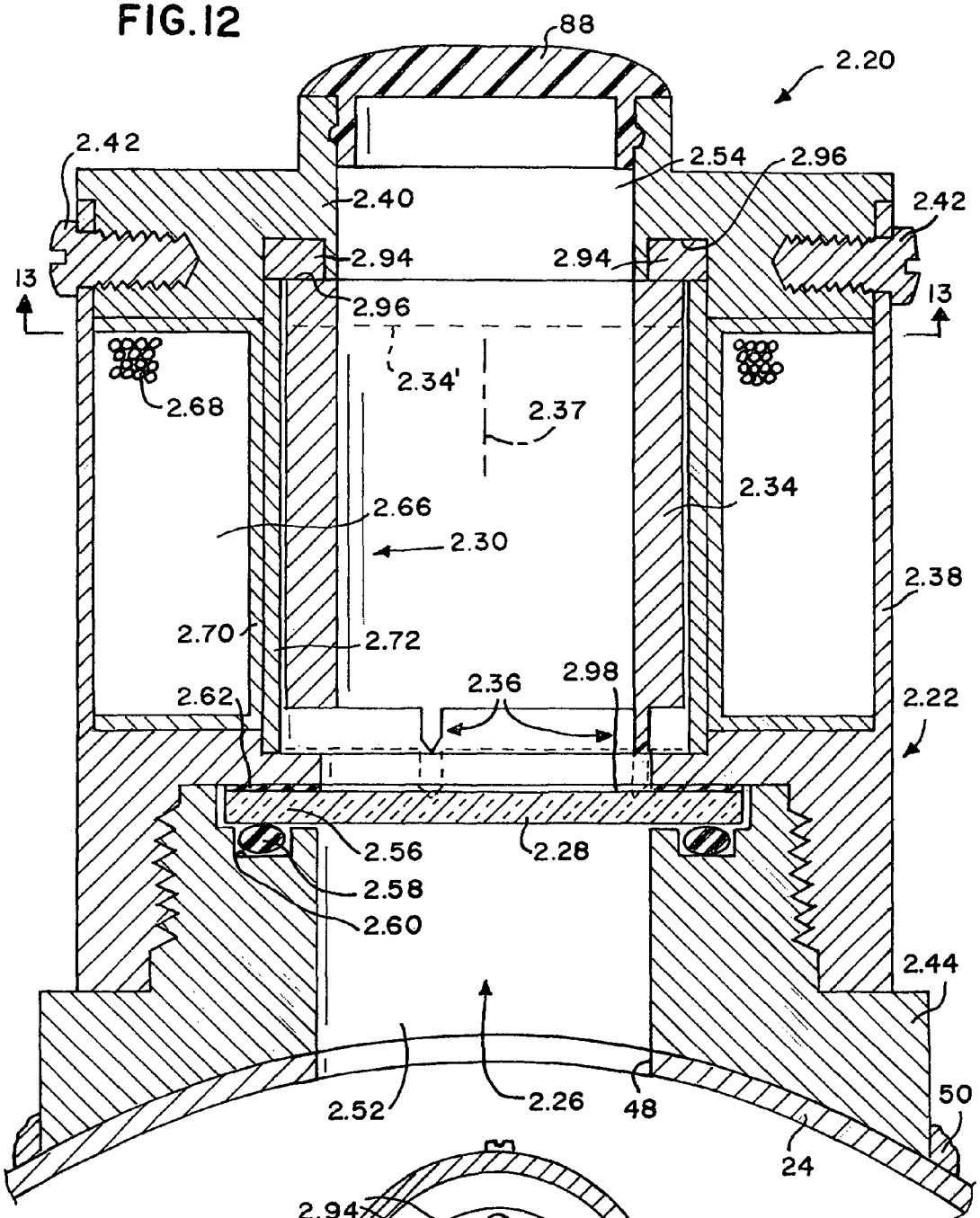
FIG. 12 is a sectional view of a second embodiment of the present invention taken along a diameter thereof, showing the armature in a first position and, in dotted outline, showing the armature as it moves into a second position in which the teeth impact the frangible seal.
Figure 13:
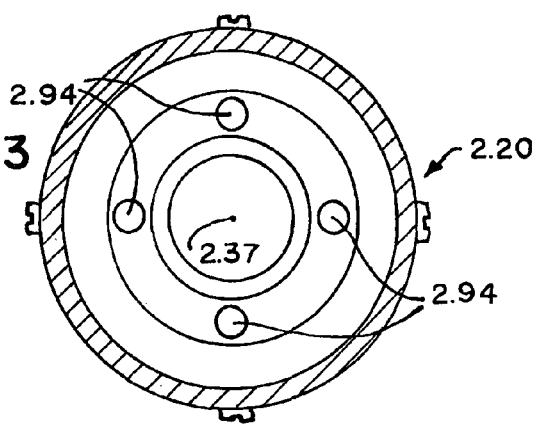
FIG. 13 is an upward-looking transverse view of the second embodiment of the present invention, taken substantially along the line 13-13 shown in FIG. 12, showing the mounting of the magnets.

Solenoid 2.30 further comprises an armature 2.34 that, when coil 2.66 is energized to create a magnetic field therewithin, reciprocates downwardly from a first position shown in FIG. 12 to a second position 2.34' shown in dotted outline in FIG. 12.

Valve 2.20 further includes impacting means 2.36 for breaking frangible seal 2.28 into at least two pieces, with impacting means 2.36 being moved by armature 2.34 to break frangible seal 2.28 as armature 2.34 moves into the second position. In the second embodiment 2.20 of the present invention, impacting means 2.36 comprises at least one tooth 2.100 depending from armature 2.34 toward seal 2.28. Preferably valve 2.20 includes a plurality of teeth 2.100 angularly spaced about the axis of armature 2.34 so as to jointly impact seal 2.28 at multiple impact points adjacent periphery portion 2.56 of seal 2.28, thereby providing symmetric forces upon armature 2.34 so as not to cause armature 2.34 to bind as it reciprocates and causes teeth 2.100 to impact seal 2.28. It has been found that teeth 2.100 become blunted upon impact with seal 2.28, and an improvement of the third embodiment 3.20, hereinafter described, providing pins 3.74 separate from the armature, allows the pins to be formed of harder material than the magnetic material used for construction of the armature, thereby permitting reuse of pins 3.74 or replacement of the pins separate from the armature.

As with valve 1.20, valve 2.20 may optionally have a discharge cap 88 as heretofore described.

In order to hold the armature in the first position prior to actuation of the solenoid, one or more magnets 2.94 are mounted in the valve body as by gluing within holes 2.96 for magnetically latching armature 2.34 in the first position, and the magnets must be selected to be of sufficient strength so that armature 2.34 does not become released from the first position prior to actuation of the solenoid due to mechanical shocks that the valve might receive, because premature release of the armature prior to actuation of the solenoid could cause unwanted breakage of the frangible seal. As with the first embodiment, this latching also causes the armature to be held in its first position, while the coil is developing its full magnetic energy after actuation of the solenoid, so that a maximum kinetic energy can be imparted to the armature by the coil, thereby creating a greater impact force to break the frangible seal.

Turning now to FIGS. 5, 6, 8, 9, 10, 14, 17, and 18, the third preferred embodiment 3.20 of the valve of the present invention can now be described.

Valve body 3.22 of valve 3.20 includes a housing 3.38, a base plate 3.102 held within housing 3.38 as by a plurality of screws 3.42, a seal pressure plate 3.104 for holding frangible seal 3.56 within valve body 3.22, and a base mounting 3.44 that is made of aluminum. In a variation from the first and second embodiments, base mounting 3.44 may be separated from the valve body 3.22 and can be welded about its perimeter to vessel 24 as by weld 50 to seal base mounting 3.44 to vessel 24 while flange 3.46 is received into port 48 of vessel 24. This structure of valve 3.20 allows the valve 3.20 to be assembled and pressure tested independent of base mounting 3.44, and prevents damage to valve 3.20 as base mounting is welded to vessel 24. In a modified structure of the seal mounting of valve 2.20, a seal pressure plate 3.104 is screwingly received into threads 3.64 of base plate 3.102, as by inserting a pronged tool or wrench into blind holes 3.106 of seal pressure plate 3.104 during assembly. It shall be understood that the structure of base plate 3.102, seal pressure plate 3.104, and base mounting 3.44 could be used with embodiments 1.20 and 2.20 without departing from the spirit and scope of the present invention. A hex nut fitting 3.107, best seen in FIG. 6, is preferably provided at the top of housing 3.38 to permit tightening of valve 3.20 onto base mounting 3.44 after base mounting 3.44 has been welded to vessel 24.

Valve body 3.22 has an inlet 3.52 and an outlet 3.54 and passage 3.26 through valve body 3.22 connects inlet 3.52 to outlet 3.54, allowing the contents of vessel 24 to discharge through the valve 3.20 when frangible seal 3.28 becomes broken.

The frangible seals 3.28 and 3.28 of the second and third embodiments are substantially similar, and the previous description of seal 2.28 suffices for both.

Frangible seal 3.28 is preferably a disk of soda-lime glass gripped around its perimeter at a seal periphery portion 3.56 by entrapment within valve body 3.22 between base plate 3.102 and seal pressure plate 3.104, and a well-known Nitrile O-ring 3.58 within circular groove 3.60 in seal pressure plate 3.104 forms a seal between seal pressure plate 3.104 and frangible seal 3.28. It should be noted that valve 3.20 does not require a washer between the upper surface of seal 3.28 and base plate 3.102 to prevent seal 3.28 from breaking during assembly of seal pressure plate 3.104 into base plate 3.102 as those two parts are screwingly fitted together at threads 3.64. It has been found that this washer on the upper surface of the frangible seal could be eliminated by a more precise flatness specification/tolerance on the underside surface of base plate 3.102 that contacts frangible seal 3.28. As heretofore described for seal 2.28, seal 3.28 also provides a fail-safe mechanism whereby seal 3.28 will fracture and break if the pressure within vessel 24 becomes excessive, thereby preventing explosion of vessel 24.

Valve 3.20 includes a solenoid 3.30 comprising a coil 3.66 constructed of a length of wire 3.68 wound upon a hard-anodized aluminum bobbin 3.70. It shall be understood that bobbin 3.70 is fully wound with wire 3.68, and that only a portion of wire 3.68 is shown for illustrative purposes. Bobbin 3.70 of valve 3.20 also serves as the core of this valve, rather than having a separate core as is the case in other embodiments.

Solenoid 3.30 further comprises an armature 3.34 that, when coil 3.66 is energized to create a magnetic field therewithin, reciprocates downwardly from a first position shown in FIG. 14 to a second position shown in dotted outline as 3.34' in FIG. 14.

Valve 3.20 further includes impacting means 3.36 for breaking frangible seal 3.28 into at least two pieces, with impacting means 3.36 being moved by armature 3.34 to break frangible seal 3.28 as armature 3.34 moves into the second position. In the third embodiment 3.20 of the present invention, impacting means 3.36 comprises a pin 3.74 mounted for vertical reciprocation within valve body 3.22 preferably substantially parallel to the mutual axis 3.37 of passage 3.26 and armature 3.34. Preferably valve 3.20 includes a plurality of pins 3.74 angularly spaced about the axis of armature 3.34 and mounted within bores 3.112 through base plate 3.102 so as to jointly impact seal 3.28 at multiple impact points adjacent periphery portion 3.56 of seal 3.28, thereby providing symmetric forces upon armature 3.34 so as not to cause armature 3.34 to bind as it reciprocates and causes pins 3.74 to impact seal 3.28 as they move to a position shown in dotted outline as 3.74'. As an improvement of the third embodiment 3.20 over the second embodiment 2.20, pins 3.74 are provided separate from the armature, thereby allowing the pins to be formed of harder material than the magnetic material used for construction of the armature, thereby permitting reuse of pins 3.74 or replacement of the pins separate from the armature.

As best seen in FIG. 18, base plate 3.102 has a beveled surface 3.108, at an angle 3.110 of approximately 22 degrees, inwardly adjacent bores 3.112 for pins 3.74, thereby allowing for better discharge of frangible seal 3.28 when it becomes broken. As best seen in FIG. 17, a channel 3.114 is preferably provided within base plate 3.102 for wires 3.68 to pass from core 3.66 to the exterior of valve body 3.22.

As with valves 1.20 and 2.20, valve 3.20 may optionally have a discharge cap 88 as heretofore described.

In order to hold the armature in the first position prior to actuation of the solenoid, one or more magnets 3.94 are mounted in the bobbin 3.70 as by gluing within holes 3.96 for magnetically latching armature 3.34 in the first position, and the magnets must be selected to be of sufficient strength so that armature 3.34 does not become released from the first position prior to actuation of the solenoid due to mechanical shocks that the valve might receive, because premature release of the armature prior to actuation of the solenoid could cause unwanted breakage of the frangible seal. As with the first and second embodiments, this latching also causes the armature to be held in its first position while the coil is developing its full magnetic energy after actuation of the solenoid so that a maximum kinetic energy can be imparted to the armature by the coil, thereby creating a greater impact force to break the frangible seal.

Referring to FIG. 11, to use all embodiments of the valve of the present invention as a fire extinguishing apparatus, the valve, generically represented as valve 20 in FIG. 11, is assembled as heretofore described, tested, and mounted to a vessel 24. Wires, generically represented as 68 in FIG. 11, are connected to control circuitry means 116 interposed between a well-known electrical power source 32 valve 20 for selective connection of the power source 32 to valve 20. A plurality of inputs 118, 120, 122, are operably connected to control circuitry 116, which is responsive to the inputs and, in response thereto, applies electrical power to valve 20. Infrared sensors 118, which trigger when optical energy is detected in the near-infrared region between about 0.2 microns to 10 microns, inclusive, and preferably in the range between about 2 to 10 microns, inclusive, are provided for early-warning detection of flames or heat sources 124 and for triggering of control circuitry 116. Temperature sensors 120, well-known in the prior art, are provided to trigger control circuitry 116 when the sensed temperature reaches a certain predetermined set temperature. One or more pushbuttons 122 are provided for manual actuation of valve 20. And, as heretofore described, an overpressure condition within vessel 24 will cause fail-safe breakage of the frangible seal of valve 20. When used as a fire extinguishing apparatus, there are thus multiple ways that valve 20 can be actuated. The first and most sensitive threshold of activation is when one of infrared optical sensors 118 detects sufficient optical energy in the near-infrared range heretofore described. When the temperature sensed by one of the temperature sensors 120 detects an over-temperature condition, the valve will also be triggered. As a third way of activation, if the pressure within vessel 24 builds to the point of an overpressure condition exceeding the strength of the frangible seal, the seal will fracture because of the overpressure condition, thereby safely releasing the pressurized contents of vessel 24.

After use, the valve can then be refurbished and re-used. The tips of pins 1.74, 3.74 or teeth 2.100 may be inspected and, if necessary, pins 1.74, 3.74 could be replaced from a refurbishment kit. Likewise, if teeth 2.100 are blunted, then armature 2.34 with teeth 2.100 could be replaced as a unit. Alternatively, a maintenance history of the valve may be kept, with these parts being replaced after a certain number of actuations. In critical reliability situations, pins 1.74, 3.74, or armature 2.34 with teeth 2.100, could be replaced on every refurbishment. All seals and O-rings typically will be replaced with new seals and new O-rings at each refurbishment to ensure reliable performance and operation.

Although the present invention has been described and illustrated with respect to a preferred embodiment and a preferred use therefor, it is not to be so limited since modifications and changes can be made therein which are within the full intended scope of the invention.

I claim:

1. A single-action discharge valve for discharging the contents of a vessel, said valve comprising:
   (a) a valve body having a passage therethrough through which said contents are discharged, said passage having a perimeter thereabout and said passage having a center;
   (b) a frangible seal held within said valve body and sealing said passage while said seal is intact;
   (c) a solenoid for selective connection to a power source for selective actuation thereby, said solenoid including an armature substantially exterior of said passage and movable from a first position to a second position, with substantially all of said passage passing axially through said armature, said passage having a substantially constant cross-section area from said frangible seal through said substantially all of said passage passing axially through said armature; and
   (d) impacting means for impacting said seal remote from said center of said passage and proximate said perimeter of said passage and for breaking said seal into at least two pieces, said impacting means being moved by said armature to break said seal as said armature moves into said second position.

2. The valve as recited in claim 1, in which said valve further comprises a magnet for holding said armature into said first position until said solenoid is actuated.

3. The valve as recited in claim 1, in which said seal is a glass disk held about its perimeter within said valve body.

4. The valve as recited in claim 1, in which said impacting means comprises a tooth depending from said armature toward said seal.

5. The valve as recited in claim 1, in which said impacting means comprises a plurality of teeth depending from said armature toward said seal.

6. The valve as recited in claim 5, in which said passage has a central axis along which said armature reciprocates from said first position to said second position.

7. The valve as recited in claim 5, in which said seal is a glass disk held about its perimeter within said valve body.

8. The valve as recited in claim 7, in which said passage has a central axis along which said armature reciprocates from said first position to said second position.

9. The valve as recited in claim 1, in which said impacting means comprises a pin mounted for reciprocation within said valve body by said armature as said armature moves from said first position to said second position.

10. The valve as recited in claim 9, in which armature has a cam portion that engages said pin, and in which said reciprocation of said pin is within a plane radial with respect to said armature as said cam portion engages said pin.

11. The valve as recited in claim 1, in which said impacting means comprises a plurality of pins mounted for reciprocation within said valve body by said armature as said armature moves from said first position to said second position.

12. The valve as recited in claim 11, in which said passage has a central axis along which said armature reciprocates from said first position to said second position.

13. The valve as recited in claim 11, in which said seal is a glass disk held about its perimeter within said valve body.

14. The valve as recited in claim 13, in which said passage has a central axis along which said armature reciprocates from said first position to said second position.

15. The valve as recited in claim 11, in which said pins are spaced about said axis and said reciprocation of said pins is substantially parallel to said axis.

16. The valve as recited in claim 11, in which armature has a cam portion that engages said pins, and in which said reciprocation of said pins is radial with respect to said armature as said cam portion engages said pins.

17. The valve as recited in claim 16, in which said seal has a domed portion, said domed portion having a sidewall positioned for impact by said pins during said reciprocation of said pins.

* * * * *